United States Patent
Tafuni et al.

(10) Patent No.: US 12,252,241 B2
(45) Date of Patent: Mar. 18, 2025

(54) STABILITY AND CONTROL AUGMENTATION SYSTEM

(71) Applicant: Microtecnica S.r.l., Turin (IT)

(72) Inventors: Domenico Tafuni, Turin (IT); Simone Allevi, Appignano del Tronto (IT)

(73) Assignee: MICROTECNICA S.R.L., Turin (IT)

( * ) Notice: Subject to any disclaimer, the term of this patent is extended or adjusted under 35 U.S.C. 154(b) by 15 days.

(21) Appl. No.: 17/959,600

(22) Filed: Oct. 4, 2022

(65) Prior Publication Data
US 2023/0174228 A1 Jun. 8, 2023

(30) Foreign Application Priority Data
Dec. 8, 2021 (EP) ..................................... 21213218

(51) Int. Cl.
*B64C 27/64* (2006.01)
*B64C 13/42* (2006.01)
*B64C 27/68* (2006.01)

(52) U.S. Cl.
CPC .............. *B64C 27/64* (2013.01); *B64C 13/42* (2013.01); *B64C 27/68* (2013.01)

(58) Field of Classification Search
CPC ......... B64C 27/64; B64C 13/30; B64C 13/42; F15B 13/0436; F15B 5/003
See application file for complete search history.

(56) References Cited

U.S. PATENT DOCUMENTS

| 3,473,547 | A | * | 10/1969 | Coakley | F15B 13/0436 137/83 |
| 9,870,004 | B2 | | 1/2018 | Atkins et al. | |
| 10,836,469 | B2 | | 11/2020 | Artoni et al. | |
| 11,635,097 | B1 | * | 4/2023 | O'Rorke | F15B 15/1485 92/152 |

(Continued)

FOREIGN PATENT DOCUMENTS

| EP | 3467608 A1 | 4/2019 | |
| EP | 3628904 A1 * | 4/2020 | .......... F15B 13/0438 |

(Continued)

OTHER PUBLICATIONS

European Search Report for Application No. 21213218.7, mailed May 13, 2022, 8 pages.

(Continued)

*Primary Examiner* — Assres H Woldemaryam
*Assistant Examiner* — Anna L. Gordon
(74) *Attorney, Agent, or Firm* — CANTOR COLBURN LLP

(57) ABSTRACT

A Stability and Control Augmentation System ("SCAS") module includes a SCAS actuator. The SCAS actuator has a substantially cylindrical hydraulic chamber having a first and second regions. A piston is arranged for linear motion in first and second directions along an axis of the hydraulic chamber. The SCAS module also includes a valve system for controlling a flow of a hydraulic fluid into the hydraulic chamber. The valve system has: at least one supply line arranged to provide a first fluid flow path to the first region (Continued)

of the hydraulic chamber and/or a second fluid flow path to the second region of the hydraulic chamber, and a moveable valve member arranged to have a position between a first and second positions.

14 Claims, 7 Drawing Sheets

(56) References Cited

U.S. PATENT DOCUMENTS

| | | | | |
|---|---|---|---|---|
| 2009/0230340 A1* | 9/2009 | Purkis | ............ | E21B 34/12 |
| | | | | 251/298 |
| 2015/0292527 A1* | 10/2015 | Marger | ............ | F15B 11/22 |
| | | | | 60/494 |
| 2018/0347712 A1* | 12/2018 | Jaskiewicz | ............ | F15B 13/0436 |
| 2020/0096018 A1* | 3/2020 | Jaskiewicz | ............ | F15B 13/0438 |
| 2020/0278698 A1* | 9/2020 | Vanni | ............ | B64C 13/40 |
| 2021/0253223 A1 | 8/2021 | Mezzino et al. | | |
| 2022/0380023 A1* | 12/2022 | Takahashi | ............ | B64C 13/503 |

FOREIGN PATENT DOCUMENTS

| | | |
|---|---|---|
| EP | 3868654 A1 | 8/2021 |
| GB | 2522744 A | 8/2015 |

OTHER PUBLICATIONS

European Official Action for Application No. 21213218.7 mailed Oct. 2, 2024, 3 pages.

\* cited by examiner

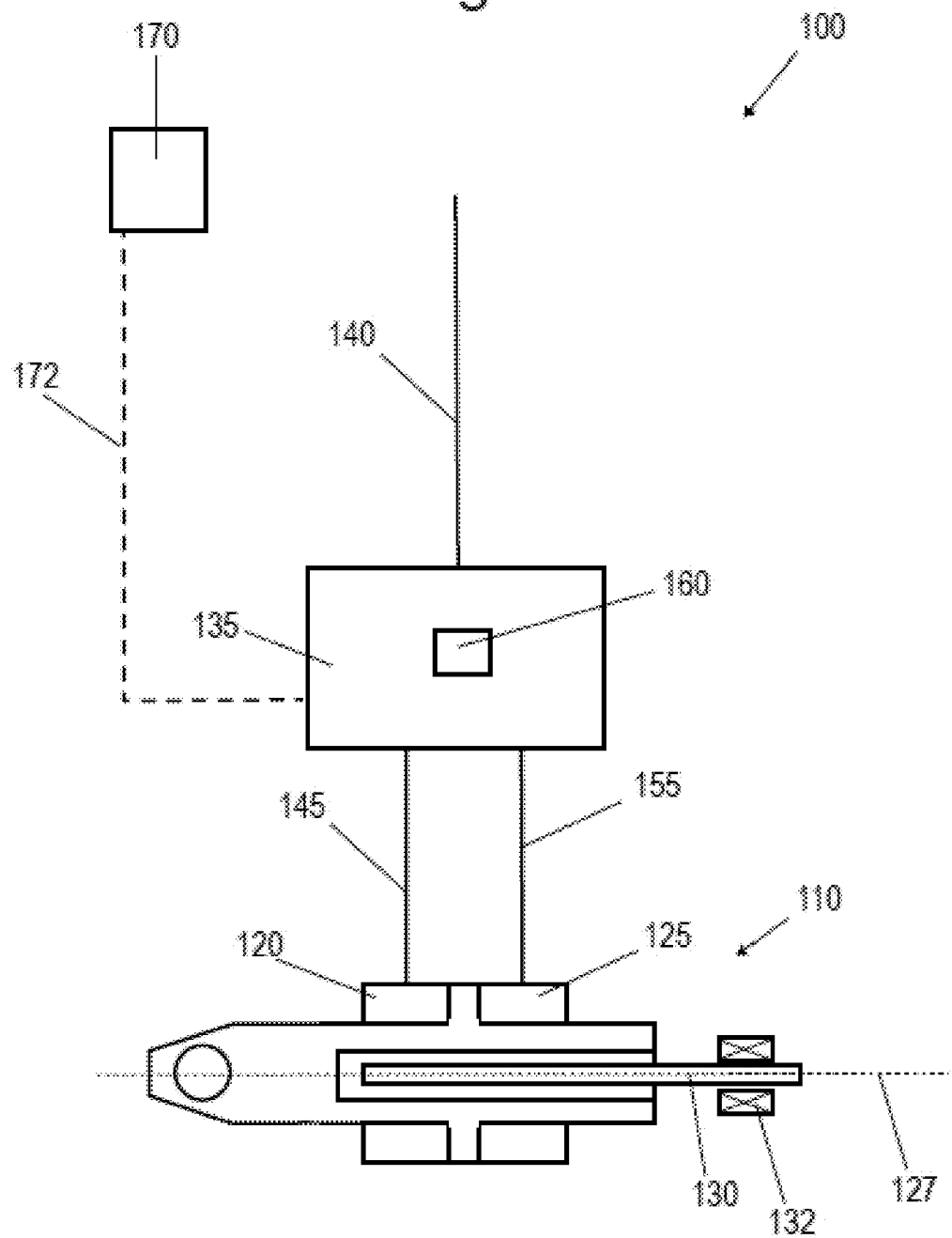

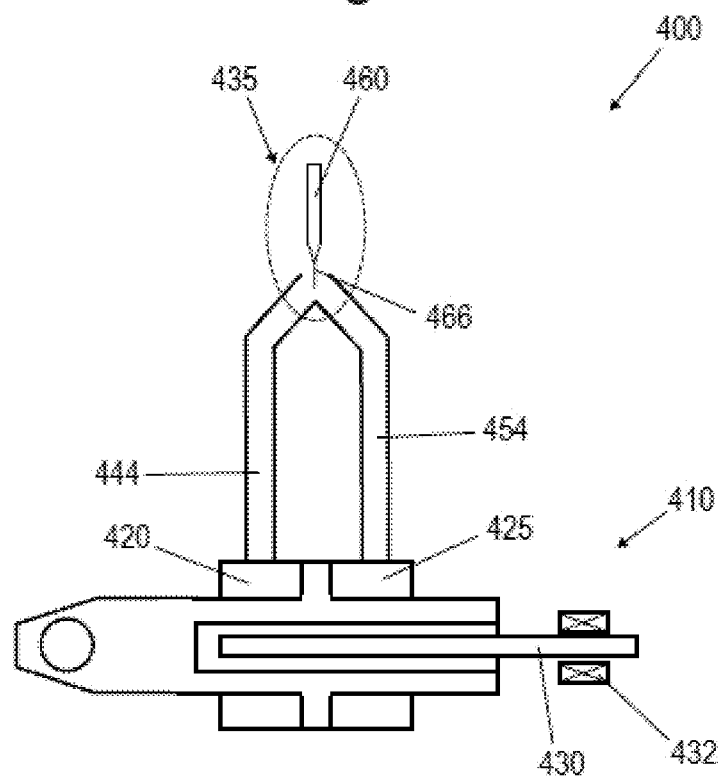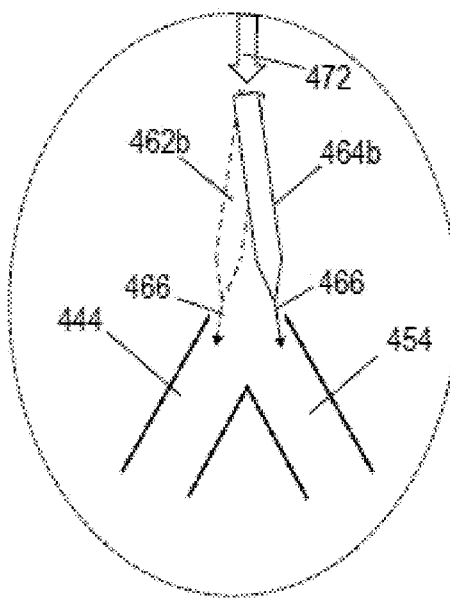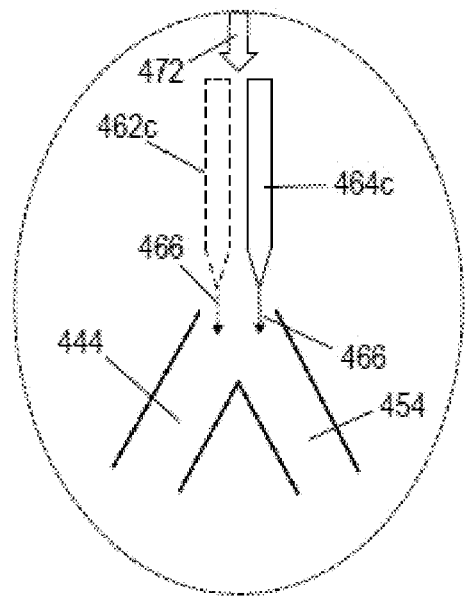

STABILITY AND CONTROL AUGMENTATION SYSTEM

CROSS-REFERENCE TO RELATED APPLICATIONS

This application claims priority to European Patent Application No. 21213218.7 filed Dec. 8, 2021, the entire contents of which is incorporated herein by reference.

FIELD

This disclosure relates to a stability and control augmentation system for a flight control surface of an aircraft, and a method of providing stability and control augmentation to a flight control surface of an aircraft.

BACKGROUND

The flight controls for a helicopter comprise various actuators that receive input commands from a pilot and provide an output for controlling the rotors in order to cause a desired movement. A Stability and Control Augmentation System (SCAS) is used to superimpose an order generated by the flight computer, i.e. the "autopilot", onto the manual input from a pilot to the main or tail rotor. The SCAS therefore helps maintain control and stability of the aircraft. The SCAS traditionally comprises a separate actuator from the main or tail rotor actuators.

Stability and Control Augmentation Systems are typically included within the mechanical linkage driving the hydraulic actuators. However, this architecture is relatively massive and complex. Improvements in SCASs are therefore desirable. It is desired to provide an improved SCAS module with reduced size and reduced weight.

SUMMARY

According to this disclosure, there is provided a Stability and Control Augmentation System ("SCAS") module includes a SCAS actuator and a valve system. The SCAS actuator includes: a substantially cylindrical hydraulic chamber that has a first region and a second region; and a piston arranged for linear motion in a first direction and a second direction along an axis of the substantially cylindrical hydraulic chamber. The valve system is for controlling a flow of a fluid into the hydraulic chamber. The valve system includes: at least one supply line arranged to provide a first fluid flow path to the first region of the hydraulic chamber and/or a second fluid flow path to the second region of the hydraulic chamber; and a moveable valve member arranged to have a position between a first position and a second position. When the moveable valve member is in the first position the moveable valve member decreases the pressure of the fluid flowing into the first region of the hydraulic chamber through the first fluid flow path with respect to the pressure of the fluid flowing into the second region of the hydraulic chamber through the second fluid flow path such that the piston is moved in the first direction. When the moveable valve member is in the second position the moveable valve member increases the pressure of the fluid flowing into the first region of the hydraulic chamber through the first fluid flow path with respect to the pressure of the fluid flowing into the second region of the hydraulic chamber through the second fluid flow path such that the piston is moved in the second direction.

Also according to this disclosure, an actuator system for a helicopter is provided. The actuator system includes a main rotor actuator and a Stability and Control Augmentation System ("SCAS") module of any embodiment disclosed herein. The system also includes a main control valve, wherein the main control valve controls a supply of fluid to the SCAS module, and thus the position of the piston within the substantially cylindrical hydraulic chamber.

The SCAS module includes a simplified valve system which may be used to provide stability and control augmentation. The valve system is operable to control the pressure of the fluid flowing in the first and second fluid flow path to the first and second regions of the hydraulic chamber respectively. The first and second regions of the hydraulic chamber may be arranged on opposing sides of a piston. The piston may then be linearly moved (in the first and second directions) in the hydraulic chamber in response to a pressure differential that is created across the piston by providing different fluid flows and thus fluids with different pressures into the first and second regions of the hydraulic chamber. By creating a pressure differential across the piston, from controlling the flow of fluid into the first and second regions using the valve system, a force is applied to the piston to move the piston in the direction of the region of the hydraulic chamber having the lower relative pressure.

In conventional SCAS systems, modification of the pressure of the fluid flowing into the hydraulic chamber, and thus the main control of the actuator, is achieved predominately by a spool as part of a control valve, i.e. the spool of a servo valve. In such systems, the control valve typically comprises an augmentation mechanism which is operable to only fractionally control the fluid flowing through the control valve and into the spool. The spool then, in response to the fluid flowing through the control valve, opens and closes the fluid flow path through the control valve with the actuation mechanism modifying how much the spool has opened or closed the fluid flow path.

The augmentation mechanism may be operable to increase or decrease the cross-section of the flow path by a fraction of the amount by which the spool is operable to increase or decrease the cross-section of the fluid flow path. The spool provides most of the control over the actuator with the augmentation mechanism only providing fine-tune control over the actuator. The spool is thus operable to increase or decrease the rate of fluid flow through the control valve to a greater extent than is the augmentation mechanism. The spool may therefore be considered to act as a means to amplify (i.e. to useable pressure differentials for controlling an actuator) fractional changes in pressure that are effected by the augmentation mechanism of conventional systems.

In some embodiments, the first direction and the second direction are opposite to (e.g. coaxial with) each other. The moveable valve member therefore increases or decreases the pressure of the fluid flowing into the first fluid flow path and the second fluid flow path in any suitable and/or desired way (within the scope of the appended claims) to move the piston in the first direction or second direction.

In some embodiments, when the moveable valve member is in the first position, the pressure of the fluid flowing into first region is at a minimum and the pressure of the fluid flowing into the second region is at a maximum, e.g. the pressure differential created across the piston is at a maximum magnitude of the SCAS module. As such, if the moveable valve member is arranged to be in the first position for an extended period of time, the piston will move (e.g. to a maximum possible position along the hydraulic chamber) in the first direction until (e.g. where) the pressure of the fluid in the first chamber is approximately equal to the pressure of the fluid in the second chamber (e.g. until the volume of the second chamber has increased (e.g. due to movement of the piston) to counterbalance the increased pressure of the fluid therein) and the pressure differential substantially tends to zero.

In some embodiments, when the moveable valve member is in the second position, the pressure of the fluid flowing into second region is at a minimum and the pressure of the fluid flowing into the first region is at a maximum, e.g. the pressure differential created across the piston is at a maximum magnitude but in the opposite direction to when the moveable valve member is in the first position. As such, if the moveable valve member is arranged to be in the second position for an extended period of time, the piston will move (e.g. to a maximum possible position along the hydraulic chamber) in the second direction until (e.g. where) the pressure of the fluid in the first chamber is approximately equal to the pressure of the fluid in the second chamber (e.g. until the volume of the first chamber has increased (e.g. due to movement of the piston) to counterbalance the increased pressure of the fluid therein) and the pressure differential substantially tends to zero.

Thus it will be appreciated that the moveable valve member alone may be able to control the pressure differential to move the piston entirely to the first and/or second positions.

The moveable valve member may move between the first position and the second position (and vice versa) continuously, such that at any given point the moveable valve member may be in any position between (and/or including) the first and second positions.

Preferably the piston comprises a (e.g. radially extended) flange that separates the first region from the second region of the hydraulic chamber. Preferably the flange extends azimuthally (e.g. all the way) around the (circumference of the) piston. Preferably the pressure of the fluid in the first and second regions acts on the flange to move the piston. Thus, the piston may move in the first or second direction in response to a pressure differential being applied across the flange. The flange of the piston may be considered to have a thrust area onto which the pressure from the fluid in the first and second region acts.

In some embodiments, the size of the flange is selected to give a thrust area such that the moveable valve member may provide (substantially full) control over the movement of the piston. For example, the size of the flange (and thus the thrust area) may be selected such that when the moveable valve is in the first (or second) position, the pressure provided to the second (or first) flow path is sufficient to exert a thrust force (thrust area multiplied by the fluid pressure) to move the piston to the maximum position in the first (or second) direction. The flange (and thus the thrust area) is preferably arranged to provide equal forces in both the first direction and the second direction, with equal (but opposite) pressure differentials. The dimensions of the flange may be selected such as to develop the required stall loads in the extended (i.e. second) and retracted (i.e. first) directions.

In some embodiments, the valve system comprises a single (e.g. one) supply line that is arranged to provide the first fluid flow path and/or the second fluid flow path to the first and second regions of the hydraulic chamber respectively. For example, the (e.g. one) supply line may be arranged to split into the first and second fluid flow paths. For example, the supply line is in fluid communication with the first fluid flow path and the second fluid flow path, wherein the extent of fluid communication between the supply line and the first fluid flow path, and/or between the supply line and the second fluid flow path, may be varied (e.g. in accordance with the position of the moveable valve member).

In some embodiments, the valve system comprises more than one supply line. For example, the valve system comprises a first supply line and a second supply line, wherein the first supply line provides the first fluid flow path to the first region of the hydraulic chamber and the second supply line provides the second fluid flow path to the second region of the hydraulic chamber.

In some embodiments, (each of) the at least one supply lines comprises a nozzle. For example, the fluid supplied to the first and/or second fluid flow path is passed through a nozzle before passing into the first and/or second fluid flow paths. In some embodiments, the moveable valve member is disposed between the nozzle of the at least one supply line and the first and/or the first and/or second flow paths.

In some embodiments, when the moveable valve member (e.g. jet pipe, e.g. flapper) is in the first position, the at least one (e.g. one) supply line may be predominantly in fluid communication with the second fluid flow path with (substantially) no fluid communication between the supply line and the first fluid flow path. Conversely, when the moveable valve member (e.g. jet pipe) is in the second position, the at least one (e.g. one) supply line may be predominantly in fluid communication with the first fluid flow path with (substantially) no fluid communication between the supply line and the second fluid flow path In such embodiments, when the position of the moveable valve (e.g. jet pipe, e.g. flapper) is in a position between the first position and the second position (e.g. continuously), the at least one (e.g. one) supply line may be in fluid communication with both the first fluid flow path and the second fluid flow path, wherein the position of the moveable valve member (e.g. jet pipe) proportionally controls the amount of fluid from the supply line that is provided to the first and second fluid flow paths.

In some embodiments, the moveable valve member (e.g. a flapper) is arranged such that, when the moveable valve member is in the first position, the moveable valve member decreases the cross-section of the first fluid flow path and increases the cross-section of the second fluid flow path, such that the pressure of the fluid flowing into the first region of the hydraulic chamber is decreased, and the pressure of the fluid flowing into the second region of the hydraulic chamber is increased.

For example, the moveable valve member (e.g. a flapper), when in the first position, at least partially physically blocks (e.g. restricts, e.g. deflects) the supply to the first fluid flow path and, at the same time, at least partially opens (e.g. increases) the supply to the second fluid flow path. As such, the cross-section of the first fluid flow path is reduced (i.e. compared to when the moveable valve member (e.g. a flapper) is at another position) and the cross-section of the second fluid flow path is increased (i.e. compared to when the moveable valve member (e.g. a flapper) is at another position).

Conversely, the moveable valve member (e.g. a flapper) is arranged such that, when the moveable valve member (e.g. a flapper) is in the second position, the moveable valve member (e.g. a flapper) increases the cross-section of the first fluid flow path and decreases the cross-section of the second fluid flow path, such that the pressure of the fluid flowing into the first region of the hydraulic chamber is increased, and the pressure of the fluid flowing into the second region of the hydraulic chamber is decreased.

For example, the moveable valve member (e.g. a flapper), when in the second position, at least partially physically blocks (e.g. restricts, e.g. deflects) the supply to the second fluid flow path and, at the same time, at least partially opens (e.g. increases) the supply to the first fluid flow path. As such, the cross-section of the second fluid flow path is reduced (i.e. compared to when the moveable valve member (e.g. a flapper) is at another position) and the cross-section of the first fluid flow path is increased (i.e. compared to when the moveable valve member is at another position). As such the cross-section of the first fluid flow path when the moveable valve member (e.g. a flapper) is in the first position is less than the cross-section of first fluid flow path when the moveable valve member (e.g. a flapper) is in the second position and vice versa for the cross-section of the second fluid flow path.

In some embodiments, the at least one supply line comprises a nozzle proximate to the moveable valve member (e.g. flapper). For example, in embodiments comprising one supply line, the one supply line comprises (e.g. terminates at) a nozzle, wherein fluid passing through the nozzle is directed into (and thus the supply line is in fluid communication with) the first and/or second supply line by the moveable valve member, e.g. flapper (e.g. by restricting the cross-section of the first and/or second fluid flow path, e.g. by deflecting the fluid primarily into the first and/or second fluid flow path).

In embodiments comprising two supply lines, both supply lines may comprise (e.g. terminate at) a nozzle, wherein the moveable valve member (e.g. a flapper). Is arranged between the two nozzles of the two supply lines. As such, fluid passing through the nozzles is directed into (and thus the supply line is in fluid communication with) the first and/or second supply line by the moveable valve member, e.g. flapper (e.g. by restricting the cross-section of the first and/or second fluid flow path, e.g. by deflecting the fluid primarily into the first and/or second fluid flow path).

In some embodiments, the moveable valve member (e.g. a jet pipe) may comprise a conduit that is fluidly connected to the at least one supply line, wherein the conduit further comprises an output that provides an output fluid supply in fluid communication with the first and/or second fluid flow paths. In some embodiments the conduit of the moveable valve member comprises (e.g. terminates in), e.g. the output fluid supply is output through a nozzle.

In such embodiments, movement of the moveable valve member (e.g. jet pipe) between the first position and the second position varies the proportion of the fluid output through the output fluid supply that is provided to the first and/or second fluid flow paths. For example, movement of the moveable valve member directs the output fluid supply (e.g. through a nozzle) to provide the first and/or second fluid flow paths to a lesser or greater extent.

In some embodiments, the moveable valve member (e.g. jet pipe) is arranged such that, when the moveable valve member (e.g. jet pipe) is in the first position, the moveable valve member provides (e.g. directs) the fluid supply output of the conduit (substantially only) to the second fluid flow path. As such, the pressure of the fluid flowing into the second region of the hydraulic chamber through the second fluid flow path is increased with respect to the pressure of the fluid flowing into the first region of the hydraulic chamber through the first fluid flow path.

Similarly, the moveable valve member (e.g. jet pipe) is arranged such that, when the moveable valve member (e.g. jet pipe) is in the second position, the moveable valve member (e.g. jet pipe) provides (e.g. directs) the fluid supply output of the conduit (substantially only) to (e.g. directed into) the first fluid flow path. As such, the pressure of the fluid flowing into the first region of the hydraulic chamber through the first fluid flow path is increased with respect to the pressure of the fluid flowing into the second region of the hydraulic chamber through the second fluid flow path.

In some embodiments, each of the at least one supply line comprises (e.g. consists of) at least one input line and at least one output line. In some embodiments, the moveable valve member is disposed between the at least one input line and the at least one output line. In some embodiments, (each of) the at least one input line(s) comprises a nozzle, e.g. the nozzle is arranged at the end of the input line proximate to the moveable valve member.

In some embodiments, the number of input lines and the number of output lines may be the same. For example, a valve system comprising a first and a second supply line may have a first and a second input line, and a first and a second output line. The first input line may be in fluid communication with the first output line (e.g. the first output line provides the first fluid flow path) and the second input line may be in fluid communication with the second output line (e.g. the second output line provides the first fluid flow path). The moveable valve member may be disposed between the first input line and the first output (and disposed between the second input line and the second output line).

In some embodiments, the number of input lines and the number of output lines may be different. For example, a valve system comprising one supply line may have one input line and two (e.g. a first and a second) output lines (e.g., wherein the first and second output lines provide the first and second fluid flow paths respectively). The input line may be in fluid communication with both the output lines and the moveable valve member may be disposed between the input line and the two output lines.

By arranging the moveable valve member to be disposed between the input line(s) and the output lines, the pressure of the fluid provided to the output lines (which in turn provides the first or second fluid flow paths) may be modified with respect to the fluid flowing through the input line(s).

For example, in embodiments where moving the moveable valve member (e.g. flapper) is arranged to at least partially physically block (e.g. restrict, e.g. deflect) the supply to the first fluid flow path (and thus reduce the cross-section of the first fluid flow path) the fluid communication between the input line and a first output line (which provided to the first fluid flow path) is reduced and the pressure of the fluid in the output line (provided to the first fluid flow path) is reduced. Conversely, if the moveable valve member is arranged to open (e.g. increase) the supply to the second fluid flow path (e.g. the cross-section of the first fluid flow path is increased) the fluid communication between the input line and the first output line (provided to the first fluid flow path) is increased and the pressure of the fluid in the output line (provided to the first fluid flow path) is increased.

Additionally, or alternatively, in embodiments wherein the moveable valve member (e.g. jet pipe) comprises a conduit in communication with the supply line, the output supply line from the conduit may be in fluid communication with the first output line (provided to the first fluid flow path) such that the fluid output from the conduit via the output supply line flows into the first output line which provides the first fluid flow path.

For example, in embodiments where the moveable valve member (e.g. flapper) is arranged to at least partially physically block (e.g. restrict, e.g. deflect) the supply to the second fluid flow path (and thus reduce the cross-section of the second fluid flow path) the fluid communication between the input line and the second output line (provided to the second fluid flow path) is reduced and the pressure of the fluid in the second output line (provided to the second fluid flow path) is reduced. Conversely, if the moveable valve member is arranged to open (e.g. increase) the supply to the second fluid flow path (e.g. the cross-section of the second fluid flow path is increased) the fluid communication between the input line and the second output line (provided to the second fluid flow path) is increased and the pressure of the fluid in the second output line (provided to the second fluid flow path) is increased.

In some embodiments, the first fluid flow path and the second fluid flow path provide a direct flow path (i.e. without passing through another component, system or valve) from the moveable valve member to the first region and the second region respectively. For example, the first output line and the second output line (comprise at least one flow path that) directly (i.e. without passing through another component, system or valve) connects the position of the moveable valve member to the first and second regions of the hydraulic chamber respectively.

The output line(s) (e.g. the first and second output lines) may comprise flow paths (e.g. branching from the first output line and second output line) that provide a flow of fluid to further components of the system (e.g. a bypass valve) but, the output line(s) include at least one flow path (e.g. the first or second fluid flow path) whereby fluid may flow from the position of the moveable valve to the first or second regions of the hydraulic chamber without passing through an intervening (e.g. intermediate) component. For example, the (first and second) output lines do not include a spool arranged between the moveable valve member and the first and/or second regions of the hydraulic chamber.

In some embodiments, the movement of the moveable valve member may comprise translation, i.e. the moveable valve member is a translatable valve member (e.g. a flapper). For example, the first position and the second position may be horizontally (e.g. moved side to side) or vertically (e.g. moved up or down) displaced with respect to each other, wherein the horizontal axis and the vertical axis is defined with respect to the axis of the first input line and/or the second input line (e.g. horizontal axis is parallel to the first input line and the vertical line is perpendicular to both the axis of the first input line and the horizontal axis).

In some embodiments, the movement of the moveable valve member may comprise rotation, i.e. the moveable valve member is a pivotable valve member (e.g. a jet pipe). For example, the first position and the second position may be angularly displaced with respect to each other. In some embodiments, the first position and the second position share a common pivot point.

In some embodiments, the moveable valve member is arranged to be moved between (and including) the first position and the second position in response to an electrical control signal (e.g. transmitted from the Flight Control System (FCS), which may also be referred to as the flight computer or autopilot). For example, the valve system may comprise an electromagnet comprising an armature arranged to receive an electric current (e.g. controlled by the electrical control signal), wherein the electromagnet is connected to the moveable valve member.

The electromagnet may have an elongate shape, i.e. it may be defined by a length along a longitudinal axis (i.e. the longest dimension of the electromagnet), a width and a depth, wherein the width and the depth are defined by axes perpendicular to the longitudinal axis and by axes perpendicular to each other. In such embodiments, the moveable valve member may be connected perpendicularly to the longitudinal axis of the electromagnet, wherein the electromagnet and the moveable valve member define a first plane.

In some embodiments, the electrical control signal is arranged to vary (e.g. modify) the current which passes through the armature(s) wound around the electromagnet. This in turn modifies the magnetic field induced by the electric current in the electromagnet. In some embodiments, the valve system further comprises at least one permanent magnet which interacts with the magnetic field induced in the electromagnet which may in turn alter the attraction or repulsion of the electromagnet to the permanent magnet. This change in attraction or repulsion may then change the position of the electromagnet and thus the moveable valve member attached thereto.

For example, when the electromagnet is elongate, the valve system may comprise a permanent magnet above (and optionally additionally below) the electromagnet (i.e. the magnet(s) is in the first plane and displaced vertically to the longitudinal axis with respect to the electromagnet (and the other permanent magnet if present)). (It will be appreciated that, if a second permanent magnet is present, it has an opposite polarity to the permanent magnet on the other side of the electromagnet.) In such embodiments, the electrical control signal is arranged to change the current which passes through the armature(s) which in turn induces a change in the magnetic field in the electromagnet.

The interaction between the magnetic field induced in the electromagnet and the magnetic field of the (e.g. oppositely polarised) permanent magnet(s) may change the attraction or repulsion of the electromagnet to the permanent magnet(s). This may, in turn, result in the position of the electromagnet (and thus the moveable valve member attached thereto) changing (i.e. moving vertically up or down or horizontally side to side depending on the arrangement of the moveable valve member in relation to the first and second input lines) in response to a greater attraction or repulsion.

In another example, when the electromagnet is elongate, the valve system may comprise a permanent magnet on one side (optionally on both sides) of the electromagnet (i.e. the magnet(s) is in the first plane and displaced horizontally along the longitudinal axis with respect to the electromagnet (and the other permanent magnet if present). (It will be appreciated that, if a second permanent magnet is present, it has an opposite polarity to the permanent magnet on the other side of the electromagnet.) In such embodiments, the electrical control signal is arranged to change the current which passes through the armature(s) which in turn induces a change in the magnetic field in the electromagnet.

The interaction between the magnetic field induced in the electromagnet and the magnetic field of the (e.g. oppositely polarised) permanent magnet(s) may change the attraction or repulsion of the electromagnet to the permanent magnet(s). This may, in turn, result in the position of the electromagnet (and thus the moveable valve member attached thereto) changing i.e. moving vertically up or down or horizontally side to side depending on the arrangement of the moveable valve member in relation to the first and second input lines) in response to a greater attraction or repulsion.

In another example, when the electromagnet is elongate, the valve system may comprise four permanent magnets, a pair of permanent magnets above the electromagnet and a pair of permanent magnets below the electromagnet (i.e. displaced perpendicularly to the longitudinal axis), wherein the pair above the electromagnet are horizontally displaced (i.e. in an axis parallel to the longitudinal axis) with respect to each other, and the pair below the electromagnet are horizontally displaced (i.e. in an axis parallel to the longitudinal axis) with respect to each other. For example, the four permanent magnets form a substantially rectangular arrangement with the electromagnet in the centre.

The two permanent magnets within each pair are arranged to have opposite polarities to each other, and the two pairs are arranged to have opposite polarities to each other. In such an embodiment, the electromagnet comprises at least two armatures, one on each end of the electromagnet (i.e. each armature is displaced along the longitudinal axis with respect to the other).

When the electrical control signal is arranged to change the current passing through the armatures (e.g. each armature receives a different electrical control signal such that the electric current passing through the armatures(s) may be different), a change in the magnetic field along the electromagnet may be induced (i.e. there may be a magnetic field gradient). The interaction between the magnetic field induced in the electromagnet and the magnetic field of the pairs of permanent magnets may change the attraction or repulsion of the electromagnet to the permanent magnets.

In some examples, the attraction or repulsion may be equal and opposite at each end of the electromagnet (i.e. the magnetic field is uniform across the electromagnet) resulting in the electromagnet (and thus the moveable valve member attached thereto) pivoting. In other examples, the attraction or repulsion may be different at each end of the electromagnet (i.e. the magnetic field induced in each end of the electromagnet is different) which results in the electromagnet (and thus the moveable valve member attached thereto) being horizontally or vertically translated in addition to being pivoted.

In some embodiments, the SCAS module comprises two SCAS actuators (as described herein). The two SCAS actuators may be arranged in any suitable and/or desired configuration: however, in preferred embodiments, the SCAS actuators are arranged in parallel. It will thus be appreciated that provision of two SCAS actuators in parallel provides a fail-safe or redundancy for the module should one of the SCAS actuators experience a technical fault or become deactivated. In embodiments comprising a plurality of SCAS actuators, the piston of each SCAS actuator may be in communicatively coupled to the piston of at least one other SCAS actuator. For example, the plurality of pistons of the plurality of SCAS actuators may form a single continuous piston rod extending along a common axis of the plurality of substantially cylindrical hydraulic chamber.

In some embodiments, the SCAS actuator further comprises a solenoid valve arranged in fluid communication with, and upstream of, the at least one supply line. For example, the solenoid valve may be arranged to receive a fluid input (e.g. via a valve input line) and provide a fluid output (e.g. via a valve input line) having a desired fluid pressure to the at least one supply lines.

It will be appreciated that a solenoid valve comprises a valve component (e.g. a rubber seal and/or diaphragm) and a solenoid component (i.e. an electromagnet). The solenoid component comprises a solenoid coil and a plunger. When an electric current is passed through the solenoid coil, the solenoid component is energized and the position of the plunger is changed (e.g. linearly displaced) resulting in a modification of the (i.e. increase or decrease in the) cross-section of the fluid flow path passing from the fluid input to the fluid output. As such, the solenoid acts to modify the flow rate (and thus the pressure) of the fluid output from the solenoid valve (e.g. via the valve output line) into the valve system.

The solenoid valve may be any suitable and/or desired solenoid valve. For example, the solenoid valve may be a normally open solenoid valve wherein a biasing means (e.g. a spring) acts to keep the solenoid valve open when the solenoid component is de-energised (e.g. no current is supplied to the solenoid coil), and wherein the solenoid component acts to close the valve component when current is supplied to the solenoid coil. Alternatively, the solenoid valve may be a normally closed solenoid valve, wherein a biasing means (e.g. a spring) acts to keep the solenoid valve closed when the solenoid component is de-energised (e.g. no current is supplied to the solenoid coil), and wherein the solenoid component acts to close the valve component when current is supplied to the solenoid coil. In some embodiments, the solenoid valve may be a direct acting solenoid valve or a pilot operated solenoid valve.

The solenoid valve may be thus be arranged to provide (e.g. via the valve output line) a fluid output having different fluid pressure to the fluid input to the valve (e.g. via the valve input line) in response to an electrical control signal (e.g. transmitted from the Flight Control System) which acts to change the position of the solenoid component (e.g. the plunger). The solenoid valve may comprise two fluid outputs: a return output line and a valve output line. The return output line may be in fluid communication with the valve input line and provides a fluid flow path for the fluid which does not pass through the solenoid valve.

For example, if the valve component is substantially closed, it will be appreciated that the flow of fluid (e.g. the flow rate) through the valve component will be restricted and thus the fluid will pass predominantly through the return output line such that the return output line provides a return fluid output having a flow rate substantially equal to the flow rate of the fluid supplied to the solenoid valve.

When the valve component is open, it will be appreciated that at least a portion of the fluid flowing through the valve input line may pass through the valve component into the valve output line with any excess fluid (i.e. fluid flow unable to pass through the valve component due to the restricted cross-section) passing into the return output line. As such, it will be appreciated that, when the solenoid valve is open the sum of the flow rate of the fluid in the valve output line and the return line is substantially equal to the flow rate of the fluid passing into the solenoid valve via the input line.

In some embodiments, the valve output may be in fluid communication with and upstream of the at least one supply line such that the flow rate of the fluid passing into the moveable valve conduit is substantially equal to the flow rate of the fluid output from the solenoid valve via the valve output line. In such embodiments, it may be appreciated that the solenoid valve may provide a variable baseline (e.g. minimum) flow (or pressure) of fluid passing through the at least one supply line. As such, it will be appreciated that the variable fluid output from the moveable valve member (i.e. by virtue of the output fluid supply being in communication with the solenoid valve output line) acts to provide a greater flexibility and thus variability of the fluid flow modification into (and thus pressures within) the first and second regions of the hydraulic chamber.

In some embodiments, the SCAS actuator further comprises a bypass valve to provide a bypass flow path from the valve system to another line (e.g. a return line,) of the system (e.g. bypassing the hydraulic chamber). In some embodiments, the first and second output lines may comprise (in addition to the first and second flow paths to the first and second regions of the hydraulic chamber) a first and second by pass flow path (e.g. branching from the first and second output lines respectively) to the bypass valve.

It will be appreciated that the bypass valve is in parallel with the hydraulic chamber, as such, the bypass valve may not be considered to be an intervening (e.g. intermediate) component arranged between the moveable valve member and the first and/or second regions of the hydraulic chamber as the first and second output lines provide a fluid path that may not pass through the bypass valve.

In some embodiments, the bypass valve is in fluid communication with and downstream of the solenoid valve output line. As such, when it desired for the bypass flow path to be activated, an electrical control signal (e.g. transmitted from the Flight Control System) changes the position of the solenoid component such that the bypass valve is activated. When the bypass valve is activated, a flow path between the first and second fluid path is opened. As such, the fluid pressure flowing into the first and second regions of the hydraulic chamber is the same and thus the pressure differential across the piston is substantially zero.

In embodiments comprising a plurality of SCAS actuators, the provision of a bypass valve allows one (or more) of the SCAS actuators to be deactivated (e.g. by activating its associated bypass valve). This may be required when one SCAS actuator experiences failure (e.g. a component breaks), thus allowing the other SCAS actuator to maintain its function without experiencing any resistance (e.g. where the pressure differential across the piston in the deactivated SCAS actuator opposes the pressure differential across the piston in the active SCAS actuator) from the deactivated SCAS actuator.

The SCAS module or actuator system may further comprise a Flight Control System for providing electrical command signals to the one or more SCAS actuators, the main control valve and/or the solenoid valve. The main control valve may control the flow of hydraulic fluid into the SCAS module and thus the flow into the first and second regions of the hydraulic chamber. As such the position of the piston along the first axis of the hydraulic chamber may be controlled in response to the electrical command signals.

The present disclosure also provides a helicopter comprising a main rotor, a tail rotor, and an actuator system as defined herein, wherein said actuator system controls a position and/or orientation of the main rotor and/or of the tail rotor.

BRIEF DESCRIPTION OF DRAWINGS

One or more non-limiting examples will now be described, by way of example only, and with reference to the accompanying figures in which:

FIG. 1 shows a schematic of a SCAS module:

FIG. 4a shows a schematic of a SCAS module:

FIG. 4b shows a schematic representation of the highlighted portion of FIG. 4a wherein the moveable valve member is a pivotable valve member;

FIG. 4c shows a schematic representation of the highlighted portion of FIG. 4a wherein the moveable valve member translates horizontally between the first and second positions:

DETAILED DESCRIPTION

Figure 2A:
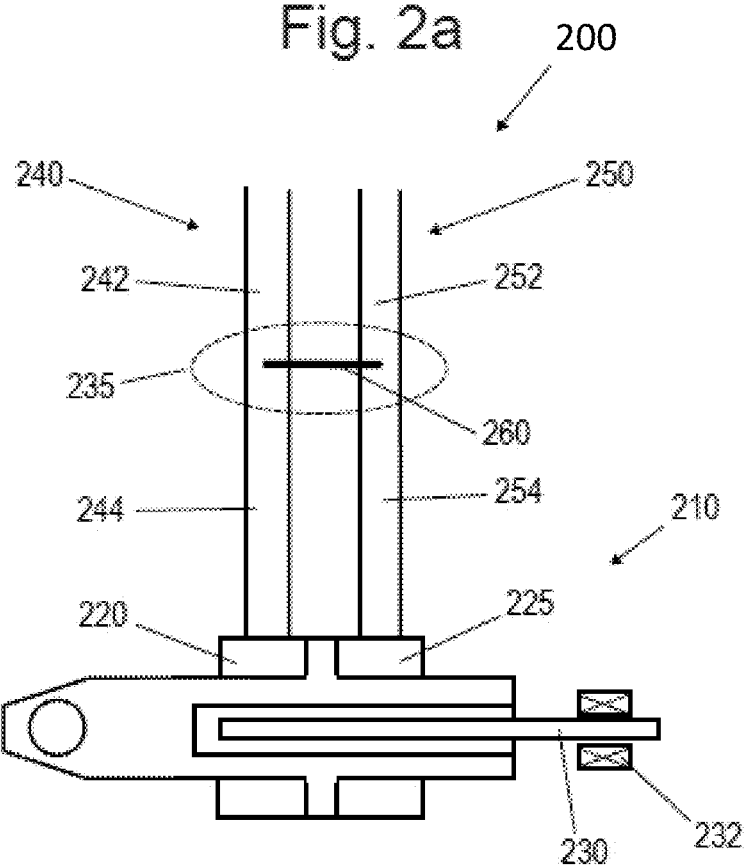
FIG. 2a shows a schematic of a SCAS module.
Figure 2B:
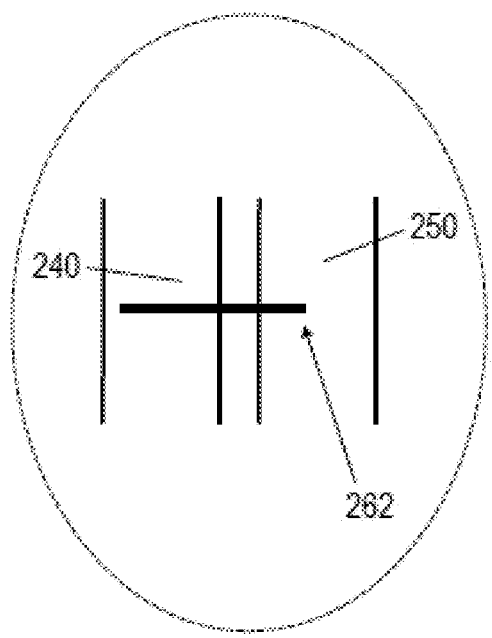
FIG. 2b shows a schematic representation of the highlighted portion of FIG. 2a with the moveable vale member in the first position.
Figure 2C:
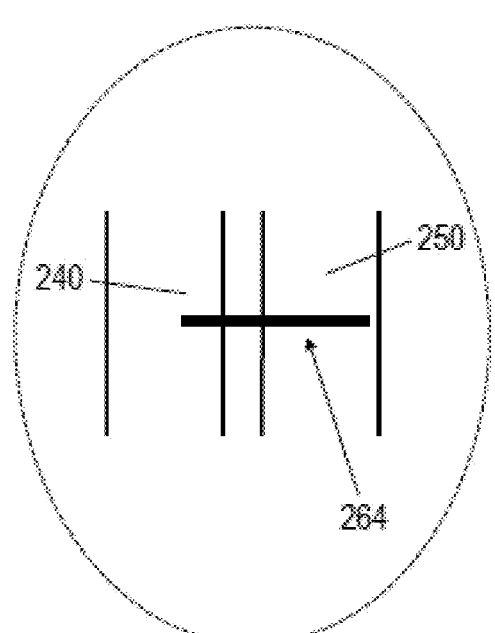
FIG. 2c shows a schematic representation of the highlighted portion of FIG. 2a with the moveable vale member in the second position.

Embodiments will now be described that provide the components of the improved SCAS module with reduced size and reduced weight.

Although, in various embodiments of the present disclosure, the output of the actuator system is arranged to control the main or tail rotor of a helicopter, it will be appreciated the techniques described herein may in general be applied to various SCAS actuator systems (i.e. not limited to helicopter main or tail rotors). For instance, the techniques described herein may be used for controlling any suitable and desired one or more flight control surfaces of an aircraft. Accordingly, whilst various embodiments will now be described with particular reference to a main rotor actuator of a helicopter, it will be appreciated that the present disclosure may extend to other systems. Particularly, it will be appreciated that the present disclosure may extend equally to both the main and tail rotor actuators of a helicopter, and that any references or disclosures relating to a main rotor actuator should therefore also be taken as references or disclosures of the same features in relation to a tail rotor actuator FIG. 1 shows a SCAS module 100. The SCAS module 100 includes a SCAS actuator 110. The SCAS actuator 110 shown includes a substantially cylindrical hydraulic chamber having a first region 120 and a second region 125. A piston 130 is arranged to move linearly within the substantially cylindrical hydraulic chamber along the primary cylindrical axis 127 of the hydraulic chamber. The linear displacement of the piston 130 is measured by a Linear Variable Displacement Transformer (LVDT) 132.

The SCAS module 100 is further shown to include a valve system 135 for controlling a flow of a fluid into the first and second regions 120, 125 of the hydraulic chamber. The valve system 135 includes a supply line 140 and a moveable valve member 160. The supply line 140 provides a first fluid flow path 145 to the first region 120 of the hydraulic chamber and a second fluid flow path 155 to the second region 125 of the hydraulic chamber. The position of the moveable valve member 160 is controlled by an electrical signal 172 which is transmitted from a Flight Control System (FCS) 170.

FIGS. 2a-2c, 3a-3c and 4a-4c all show different SCAS modules 200, 300, 400. The below description will therefore be made in reference to FIGS. 2a-2c, 3a-3c and 4a-4c.

As with the SCAS module 100 shown in FIG. 1, the SCAS modules 200, 300 shown in FIGS. 2a-2c and 3a-3c include a first supply line 240, 340 and a second supply line 250, 350. The first 240, 340 and second 250, 350 supply lines in turn comprise respective first 242, 342 and second 252, 352 input lines and first 244, 344 and second 254, 354, output lines. In contrast, SCAS module 400 shown in FIG. 4a-4c has one supply line providing a first input line 472 which is in communication with the first 444 and second 454 output lines. The SCAS modules 200, 300, 400 further include SCAS actuators 210, 310, 410.

In the SCAS modules 200, 300 shown in FIGS. 2a-2c and 3a-3c, the first input line 242, 342 and the first output line 244, 344 are in fluid communication with each other, with the moveable valve member 260, 360 disposed therebetween. Similarly, the second input line 252, 352 and the second output line 254, 354 are in fluid communication, with each other with the moveable valve member 260, 360 disposed therebetween.

Figure 3A:
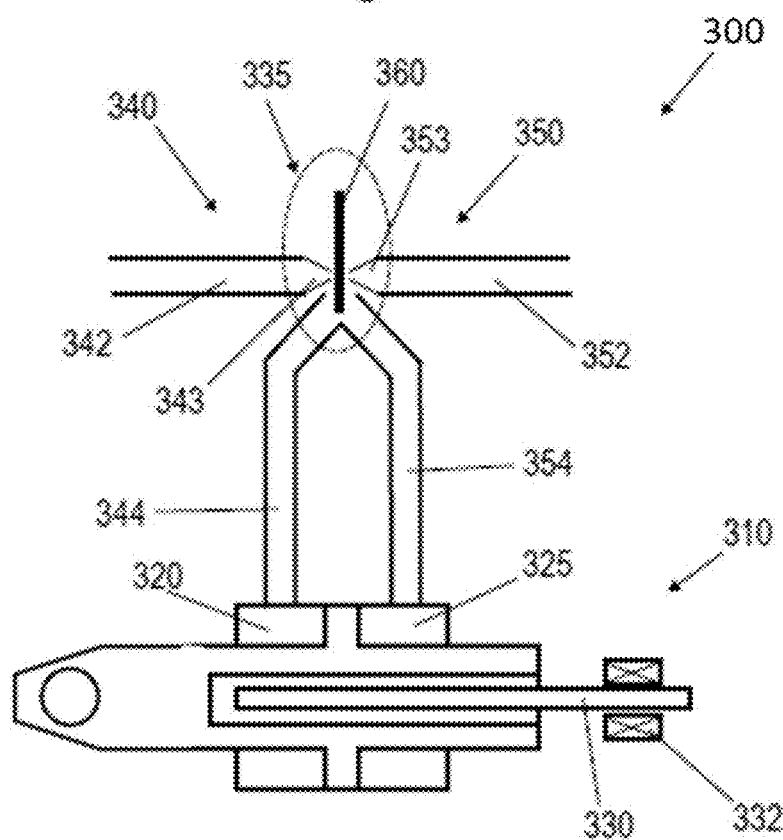
FIG. 3a shows a schematic of a SCAS module.
Figure 3B:
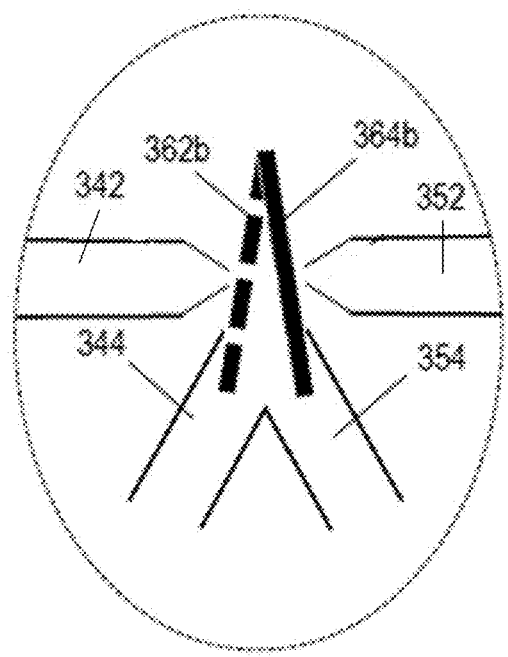
FIG. 3b shows a schematic representation of the highlighted portion of FIG. 3a wherein the moveable valve member is a pivotable valve member.
Figure 3C:
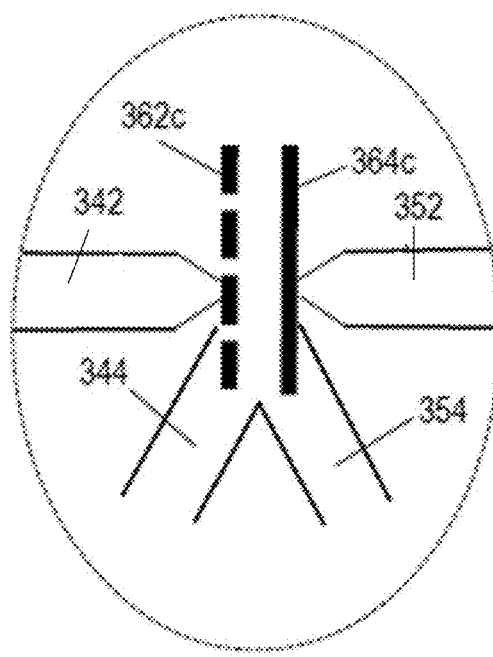
FIG. 3c shows a schematic representation of the highlighted portion of FIG. 3a wherein the moveable valve member translates horizontally between the first and second positions.

In FIG. 3a-3c the first 342 and second 352 supply lines terminate in nozzles 343, 353 proximate to the moveable valve member 360. The valve system 335 thus effectively embodies a flapper nozzle system.

In contrast, in the SCAS module 400 shown in FIG. 4a-4c, the first input line 472 is in fluid communication with both the first 444 and second 454 output lines, with the moveable valve member 460 disposed therebetween.

The first output line 244, 344, 444 provides the first fluid flow path to the first region 220, 320, 420 of the hydraulic chamber. The second output line 254, 354, 453 provides the second flow path to the second region 225, 325, 425 of the hydraulic chamber.

The movable valve member 260, 360, 460 is arranged to move in response to an electrical control signal from the Flight Control System (FCS). In FIGS. 2b, 2c, 3c and 4c, the moveable valve member 260, 360, 460 is shown to be a horizontally translatable moveable valve member where the first position 262, 362c, 462c and the second position 264, 364c, 464c are horizontally displaced with respect to each other. In FIGS. 3b and 4b, the moveable valve member 360, 460 is shown to be a pivotable valve member where the first position 362b, 462b and the second position 364b 464b are angularly displaced with respect to each other.

As shown in FIGS. 2b, 2c, 3a and 3b, moving the moveable valve member 260, 360 acts to control the cross-section of the first and second fluid flow paths by decreasing or increasing the cross-section of the first 242, 342 and second 252, 352 input lines which results in a modification of the pressure of the fluid flowing into the first 244, 344 and second 254, 354 output lines. As the first 252, 352 and second 254, 354 output lines are in direct fluid communication with the first 220, 320 and second 225, 325 regions of the hydraulic chamber, moving the movable valve member 260, 360 to a position between the first 262, 362 and second 264, 364 position directly modifies the pressure differential applied across the piston 230, 330 and thus acts to move the piston 230, 330 in the first or second direction in direct response to the position of the moveable valve member 260, 360.

In FIGS. 4a, 4b and 4c, although the movement of the moveable valve 460 may act to partially control the cross-section of the first and second fluid flow paths by decreasing or increasing the cross-section of the first 442 and second 452 input lines, the primary control for modifying the pressure of the fluid flowing into the first 444 and second 454 output lines is by selectively directing an additional output fluid supply 466 into the first 444 or second 454 output lines.

As shown in FIGS. 4b and 4c, the moveable valve member 460 includes a conduit that is fluidly connected to the supply line 472. Movement of the moveable valve member 460 between the first position 462b, 462c and the second position 464b, 464c varies the proportion of the fluid output through the output fluid supply 466 of the moveable valve member 460 that is provided to the first 444 and/or second 454 fluid flow paths.

For example, FIGS. 4b and 4c show that when the moveable valve member 460 is in the first position 462b, 462c the fluid output supply 466 from the supply 472 flowing through the moveable valve member 460 is primarily directed into the first output line 444 and the pressure of the fluid flowing into the first region 420 of the hydraulic chamber through the first fluid flow path is increased with respect to the pressure of the fluid flowing into the second region 425 of the hydraulic chamber through the second fluid flow path.

Similarly, when the moveable valve member 460 is in the second position 464b, 464c the fluid output supply 466 from the supply 472 flowing through the moveable valve member 460 is primarily directed into the second output line 454 and the pressure of the fluid flowing into the second region 425 of the hydraulic chamber through the second fluid flow path is increased with respect to the pressure of the fluid flowing into the first region 420 of the hydraulic chamber through the first fluid flow path.

Figure 5:
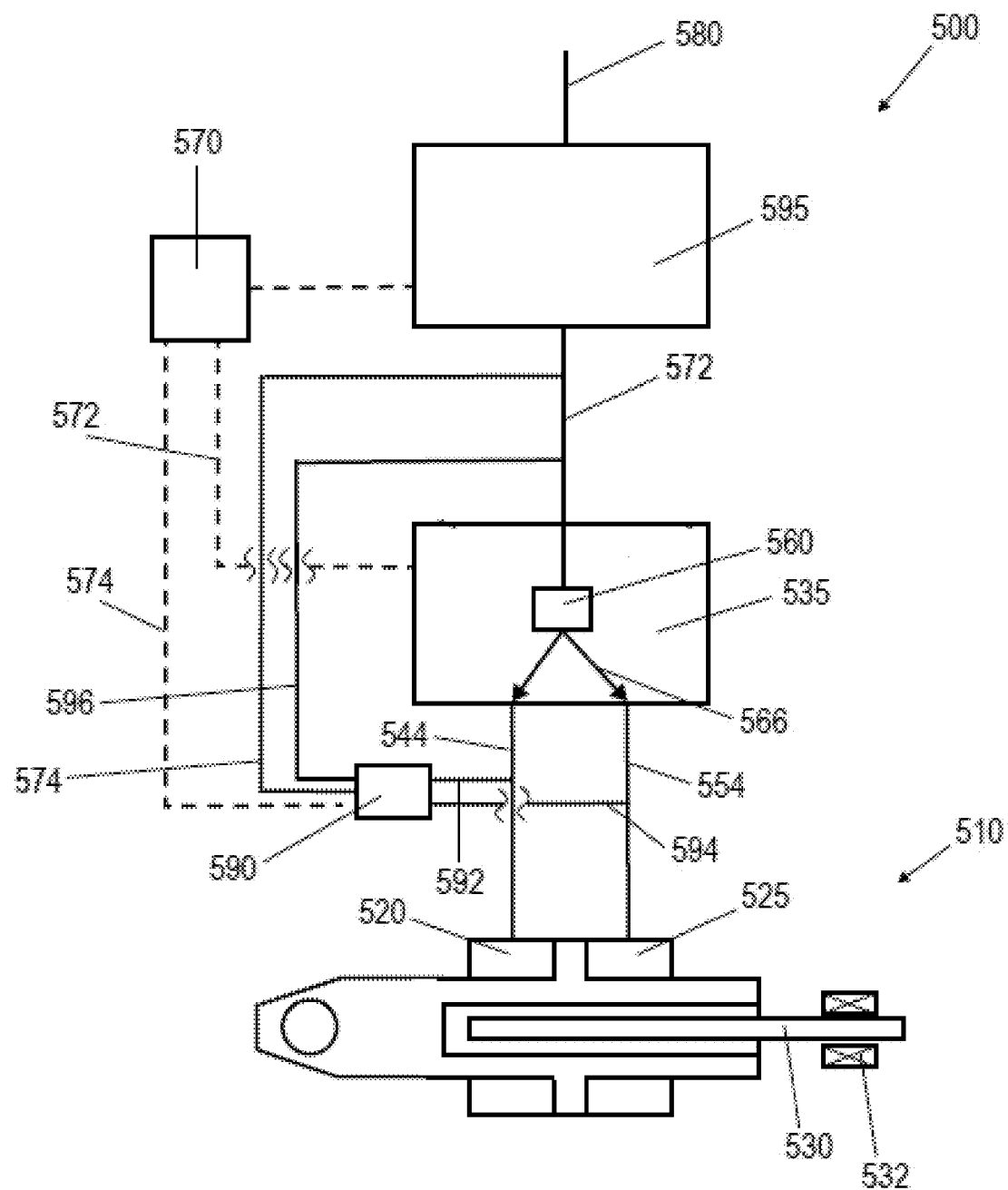
FIG. 5 shows a schematic of a SCAS module.

FIG. 5 shows a SCAS module 500. The SCAS module 500 includes a SCAS actuator 510. The SCAS actuator 510 shown includes a substantially cylindrical hydraulic chamber having a first region 520 and a second region 525. A piston 530 is arranged to move linearly within the substantially cylindrical hydraulic. The linear displacement of the piston 530 is measured by the Linear Variable Displacement Transformer (LVDT) 532.

The SCAS module 500 is further shown to include a valve system 535 for controlling a flow of a fluid into the hydraulic chamber. The valve system 535 includes a supply line 572 and a moveable valve member 560, wherein the moveable valve member 560 is fluidly connected to the supply line 572. The valve system outputs a first output 544 to the first region 520 of the hydraulic chamber and a second output 554 to the second region 525 of the hydraulic chamber.

The first output 544 and the second output 554 is also in fluid communication with the output supply 566 from the moveable valve member, with the amount of fluid flowing from the fluid output supply 566 into the first 544 and second 554 output lines controlled by the position of the moveable member 560.

The first 544 and second 554 output lines are also shown to be in fluid communication with first 592 and second 594 bypass lines which branch from the first 544 and second 554 output lines. The first 592 and second 594 bypass lines supply a bypass valve 590 which provides a first 596 and second 574 return line to the input supply line (shown to be the input supply line 572, although this is not intended to be limiting and any suitable combination may be used). The first 592 and second 594 bypass lines thus provide a flow path whereby the fluid from the first 544 and second 554 output lines are fluidly connected when the bypass valve 590 is activated.

The SCAS module 500 is also shown to include a solenoid valve 595 which receives an input from supply line 580 and provides the fluid supply for the supply line 572.

The FCS 570 provides an electrical control system to the bypass valve 590, moveable valve member 560 and the solenoid valve 595.

Figure 6:
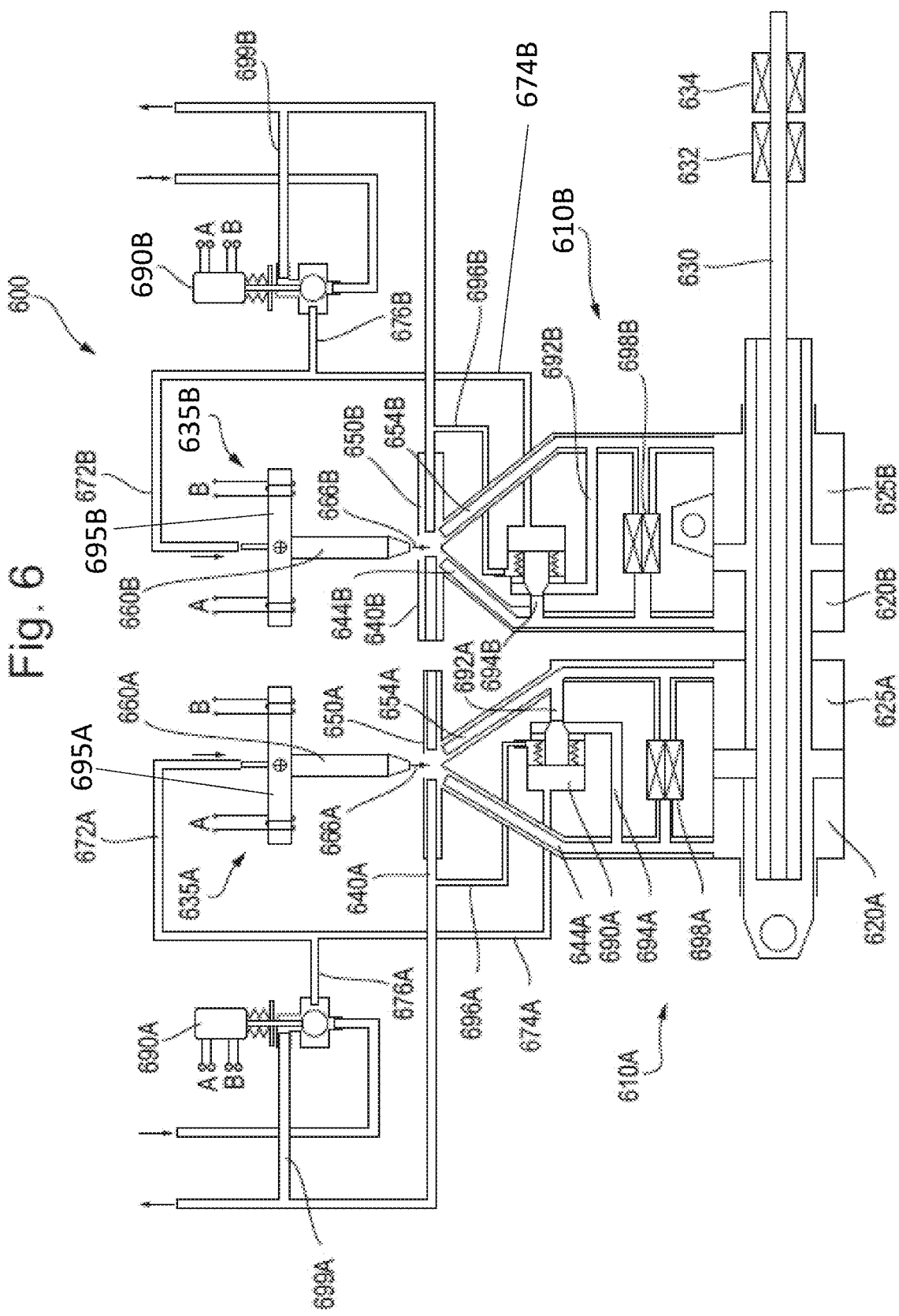
FIG. 6 shows a schematic of a SCAS module.

FIG. 6 shows a SCAS module 600 which includes two SCAS actuators 610A, 610B. The SCAS module 600 comprises return lines 640A, 640B, 650A, 650B and a supply line 672A, 672B provided by the solenoid valve 690A. After passing through the solenoid valve 690A, 690B the fluid flows into the return line 699A, 699B which supplies fluid to the return lines 640A, 640B, 650A, 650B. A valve output 676A, 676B supplies fluid to the supply line 672A, 672B. The first 644A, 644B and second 654A, 654B output lines are in fluid communication with the output supply 666A, 666B.

Moving the moveable valve member 660A, 660B may act to control the cross-section of the first and second fluid flow paths by varying the proportion of the fluid output through the output fluid supply 666A, 666B of the moveable valve member 660 that is provided to the first 644A, 644B and/or second 654A, 654B fluid flow paths (as described above in relation to FIGS. 4b and 4c).

Moving the moveable valve member 660A, 660B may additionally act to control the cross-section of the first and second fluid flow paths by decreasing or increasing the cross-section of the first 640A, 640B and second 650A, 650B return lines which results in a modification of the pressure of the fluid flowing into the first 644A, 644B and second 654A, 654B output lines. As the first 644A, 644B and second 654A, 654B output lines are in direct fluid communication with the first 620A, 620B and second 625A, 625B regions of the hydraulic chamber, moving the movable valve member 660A, 660B to a position between the first and second position directly modifies the pressure differential applied across the piston 660A, 660B and thus acts to move the piston in the first or second direction in direct response to the position of the moveable valve member 660A, 660B.

The movable valve member 660A, 660B is arranged to move in response to an electrical control signal from the Flight Control System (FCS) which may also be referred to as the flight computer or autopilot. The electrical control signal is transmitted to an electromagnet which is connected to the moveable valve member 660A, 660B. The electromagnet 695A, 695B comprises two armatures A, B which induce a magnetic field in the electromagnet when an electric field controlled by the electrical control signal is passed through the armatures. Permanent magnets (not shown) are placed above and below the electromagnet 695A, 695B to interact with the magnetic field of the electromagnet 695A, 695B and thus, when the magnetic field induced in the electromagnet 695A, 695B is changed by the electrical control signal the change in attraction or repulsion of the electromagnet 695A, 695B to the permanent magnets acts to displace the moveable valve member 660A, 660B, i.e. to pivot the movable valve member 660A, 660B.

After passing through the valve system 635A, 635B, the fluid passes into the first 620A, 620B and second 625A, 625B regions of the hydraulic chamber to establish a pressure difference across the piston and thus move the piston in the first or second direction. The movement of the piston is measured by the Linear Variable Differential Transformers 632, 634 which can provide a feedback signal to the FCS.

A bypass valve 690A, 690B is provided downstream of the valve system 635A, 635B to provide a bypass flow path in the first 640A, 640B and second 650A, 650B return lines such that the fluid may flow from the first 640A, 640B and second 650A, 650B return lines through the first 692A, 692B and second 694A, 694B bypass input lines into the first 696A, 696B and second 674A, 674B return lines without entering the first 620A, 620B and second 625A, 625B regions of the hydraulic chamber. The first bypass return line 696A, 696B is shown to be connected to the return line 699A, 699B of the solenoid valve. The second bypass return line 674A, 674B is shown to be connected to the supply line 672A, 672B.

The SCAS module 600 is further shown to comprise a pressure sensor 698A, 698B which may be used to measure the pressure differential between the first output line 644A, 644B and the second output line 654A, 654B. This in turn may be communicated to the FCS as a feedback signal such that the position of the moveable valve member 660A, 660B may be changed to effect the desired change.

Figure 7:
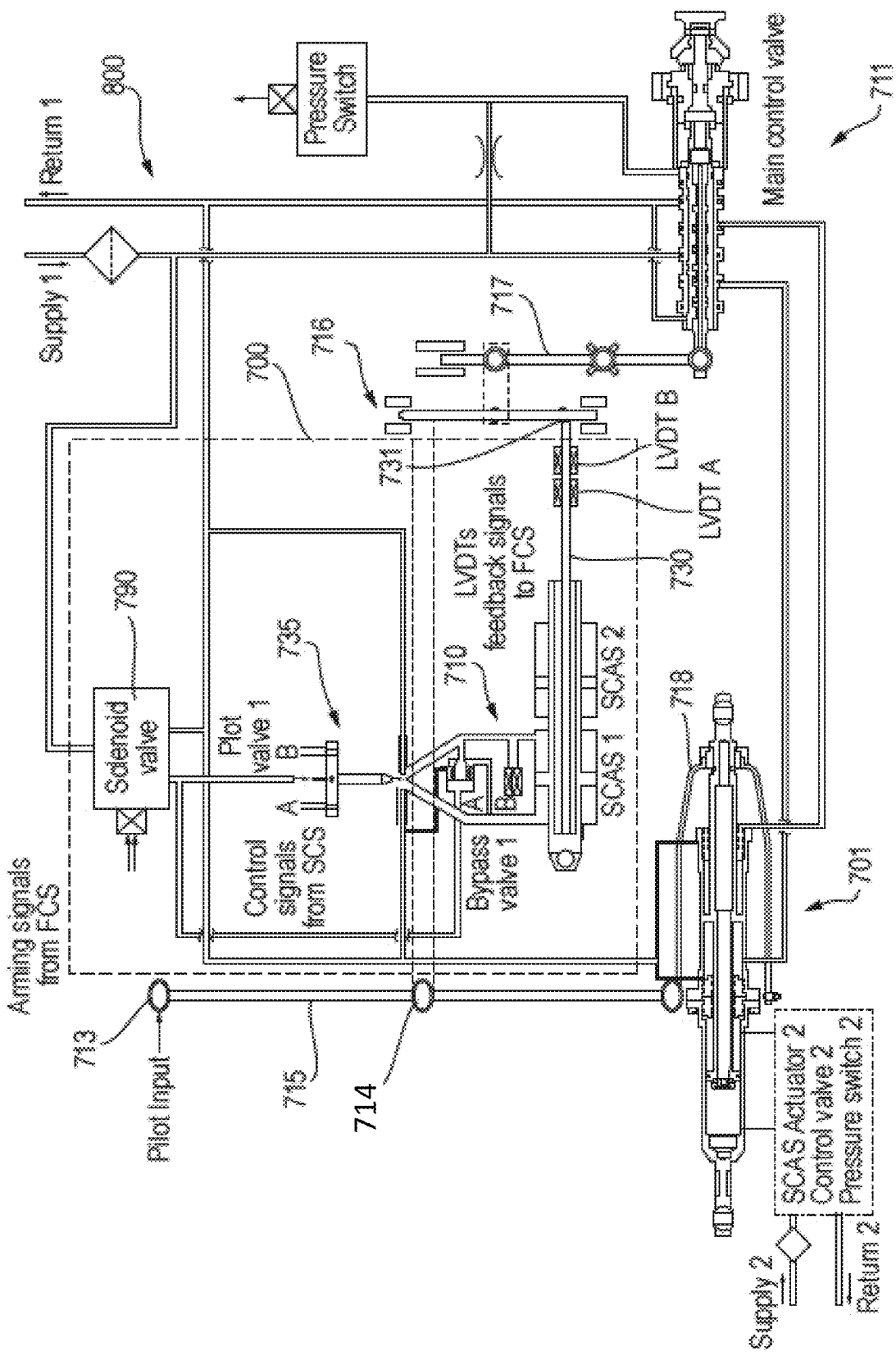
FIG. 7 shows a schematic of a SCAS actuator system comprising a SCAS module.

FIG. 7 illustrates conceptually the arrangement of various components that may constitute a main (or tail) rotor actuator system with an integrated SCAS module according to some embodiments of the present disclosure, and how these components interrelate and interact with each other, as explained in more detail below.

The main rotor actuator system, as shown in FIG. 7 comprises a main rotor actuator 701 and a SCAS module 700 (as described above in relation to FIGS. 1-6) comprising a piston 730 arranged to slide linearly within a substantially cylindrical housing.

An actuator rod end 731 may be mounted at the moving rod side of the piston 730 to facilitate connection of the piston 730 to the helicopter moving parts. The actuator rod end 731 may, for example, end with a spherical joint. Generally however the actuator rod end 731 may take any form suitable for interfacing with the parts to which it is connected in use. The actuator rod end 731 may be mounted to the piston 730 in any suitable manner. For example, the rod end 731 may be mounted by means of a threaded connection. A locking mechanism may also be provided such as a tab washer provided on the rod end 731 for engaging with an axial milling in the piston 730.

The output of the main rotor actuator 701 is controlled by a linkage mechanism connecting the main rotor actuator 701 to the main control valve 711 via a feedback link 718. The linkage mechanism comprises a series of interconnected levers.

Particularly, as shown in FIG. 7, the linkage mechanism may comprise a first input lever 715 arranged to receive a pilot input at one end 713, wherein the opposite end of the input lever 715 is connected to the feedback link 718 which is hinged to the output of the actuator 710. Thus, the midpoint 714 of the first input lever 715 will be displaced, in use, by an amount equal to half the difference between the pilot input end 713 of the lever 715 and the displacement of the piston 730 of the actuator 701. The midpoint 714 of the input lever 715 may thus provide a mechanical input to the downstream portion of the linkage mechanism, and this input is transmitted to the main control valve(s) 711. Responsive to this, the main control valve(s) 711 may then meter the fluid flow to/from respective control lines to the hydraulic actuator 701 to cause the actuator output to change.

Thus, it will be appreciated that the linkage mechanism effectively acts as an internal feedback loop that mechanically performs the difference between an input command (either from the pilot as described above, or from the SCAS module 700, as described above) and the output of the actuator 701. This difference may be used to determine the position of spools of the main control valve(s) 711 that port the hydraulic fluid to the appropriate chambers of the tandem hydraulic actuator 701. The pressures acting on the piston 730 of the actuator 701 thereby develop the force necessary to drive the external load, i.e. to move the main (or tail) rotor.

As shown in FIG. 7, a SCAS module 700 comprising a SCAS actuator 710 is integrated within the mechanical input system of the actuator 701 via the linkage mechanism. Particularly, the midpoint 714 of the first input lever 715 is connected by a hinge to one end of an intermediate lever 716, with the other end of the intermediate lever 716 connected to the SCAS actuator 710 via the rod end 731. The intermediate lever 716 thus acts to sum the commands from the pilot and the SCAS into a single composite command. The composite command is then transmitted by a further layshaft lever 717 to the main control valves 711. For example, as shown in FIG. 7, the layshaft lever 717 may rotate about a fixed hinge, with one end of the layshaft lever 717 connected to the midpoint of the intermediate lever 716 and the other end of the layshaft lever 717 connected to the spools of the control valves 711. As a result, the spools of the main control valves 711 are moved in response to input commands from the pilot and/or SCAS.

Embodiments of the SCAS module 100, 200, 300, 400, 500, 600 and actuator system 800 have a reduced size and reduced weight by removing the two-stage servo-valve system conventionally found in SCAS systems. Embodiments of the simplified valve system 135, 235, 335, 435, 535, 635, 735 have a moveable valve member 160, 260, 360, 460, 560, 660 that acts to modify the pressure differential within a hydraulic chamber to move a piston 130, 230, 330, 430, 530, 630, 730.

As will be seen from the above, in embodiments, the moveable valve member may be used to provide predominant control over the pressure of the fluid flowing into the hydraulic chamber without requiring the presence (and thus amplification) of a spool. For example, the fractional changes that are able to be effected by moving the moveable valve member from the first position to the second position are significant enough that the moveable valve member may provide (e.g. substantially) predominant control over the actuator and not just be limited to fine-tune control as was previously accepted within the art. As such, embodiments thus simplify the valve system required to control the flow of fluid into the hydraulic chamber of the SACS, e.g. by eliminating the need for a two stage servo-valve. This saves weight and mechanical complexity of the system with a (minimal if at all) negative impact on the dynamic performance of the SCAS control.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A Stability and Control Augmentation System ("SCAS") module comprising a SCAS actuator, the SCAS actuator comprising:
    a substantially cylindrical hydraulic chamber, wherein the cylindrical hydraulic chamber comprises a first region and a second region;
    a piston arranged for linear motion in a first direction and a second direction along an axis of the hydraulic chamber;
    wherein the SCAS module comprises:
        a valve system for controlling a flow of a hydraulic fluid into the hydraulic chamber, wherein the valve system comprises:
            a supply line arranged to provide a first fluid flow path to the first region of the hydraulic chamber and/or a second fluid flow path to the second region of the hydraulic chamber;
            a moveable valve member arranged to have a position between a first position and a second position;
            wherein when the moveable valve member is in the first position the moveable valve member decreases the pressure of the fluid flowing into the first region of the hydraulic chamber through the first fluid flow path with respect to the pressure of the fluid flowing into the second region of the hydraulic chamber through the second fluid flow path such that the piston is moved in the first direction; and
            wherein when the moveable valve member is in the second position the moveable valve member increases the pressure of the fluid flowing into the first region of the hydraulic chamber through the first fluid flow path with respect to the pressure of the fluid flowing into the second region of the hydraulic chamber through the second fluid flow path such that the piston is moved in the second direction;
            wherein the SCAS module comprises one supply line and the moveable valve member comprises a conduit that is fluidly connected to said supply line; and
            wherein the movable valve member is configured to move linearly between the first position and the second position.

2. The SCAS module of claim 1, wherein the moveable valve member is arranged such that:
    when the moveable valve is in the first position, the moveable valve member decreases the cross-section of the first fluid flow path and increases the cross-section of the second fluid flow path, such that the pressure of the fluid flowing into the first region of the hydraulic chamber is decreased, and the pressure of the fluid flowing into the second region of the hydraulic chamber is increased; and
    when the moveable valve member is in the second position, the moveable valve member increases the cross-section of the first fluid flow path and decreases the cross-section of the second fluid flow path, such that the pressure of the fluid flowing into the first region of the hydraulic chamber is increased, and the pressure of the fluid flowing into the second region of the hydraulic chamber is decreased.

3. The SCAS module of claim 1, wherein the conduit comprises an output that provides an output fluid supply in fluid communication with the supply line.

4. The SCAS module of claim 3, wherein the moveable valve member is arranged such that:
    when the moveable valve member is in the first position, the moveable valve member provides the fluid supply output of the conduit to the first fluid flow path, such that the pressure of the fluid flowing into the first region of the hydraulic chamber through the first fluid flow path is decreased with respect to the pressure of the fluid flowing into the second region of the hydraulic chamber through the second fluid flow path;

when the moveable valve member is in the second position, the moveable valve member provides the fluid supply output of the conduit to the second fluid flow path, such that the pressure of the fluid flowing into the second region of the hydraulic chamber through the second fluid flow path is decreased with respect to the pressure of the fluid flowing into the first region of the hydraulic chamber through the first fluid flow path.

5. The SCAS module of claim 4, wherein:

the supply line comprises a first input line, a first output line and a second output line;

wherein the first input line is in fluid communication with the first output line and the moveable valve member is disposed therebetween; and/or the first input line is in fluid communication with the second output line and the moveable valve member is disposed therebetween.

6. The SCAS module of claim 1, wherein:

the supply line comprises at least one input line and at least one output line, wherein the moveable valve member is disposed therebetween.

7. The SCAS module of claim 1, wherein the first fluid flow path and the second fluid flow path provides a direct flow path from the moveable valve member to the first region and the second region respectively.

8. The SCAS module of claim 1, wherein the moveable valve member is a pivotable member.

9. The SCAS module of claim 1, wherein the first position and the second position of the moveable valve member are angularly displaced with respect to each other.

10. The SCAS module of claim 1, wherein the moveable valve member is moved to the position between the first position and the second position in response to an electrical control signal.

11. The SCAS module of claim 1, wherein the SCAS module comprises two SCAS actuators arranged in parallel.

12. An actuator system for a helicopter comprising:
a main rotor actuator;
a Stability and Control Augmentation System ("SCAS") module as claimed in claim 1; and
a main control valve, wherein the main control valve controls a supply of fluid to the SCAS module, and thus the position of the piston within the substantially cylindrical hydraulic chamber.

13. An actuator system as claimed in claim 12, the actuator system further comprising a flight control system for providing electrical command signals to the SCAS module.

14. A helicopter comprising:
a main rotor,
a tail rotor; and
an actuator system as claimed in claim 12, wherein the actuator system controls a position and/or orientation of the main rotor or of the tail rotor.

* * * * *